United States Patent
Stammel et al.

(10) Patent No.: US 9,516,976 B2
(45) Date of Patent: Dec. 13, 2016

(54) SANITARY FACILITY COMPRISING A WASHSTAND AND A SUPPORT CABINET

(71) Applicant: Duravit Aktiengesellschaft, Hornberg (DE)

(72) Inventors: Thomas Stammel, Hornberg (DE); Erich Fuhrer, Hornberg (DE); Ulrich Weber, Haslach (DE)

(73) Assignee: DURAVIT AKTIENGESELLSCHAFT, Hornberg (DE)

( * ) Notice: Subject to any disclaimer, the term of this patent is extended or adjusted under 35 U.S.C. 154(b) by 231 days.

(21) Appl. No.: 14/584,133

(22) Filed: Dec. 29, 2014

(65) Prior Publication Data
US 2015/0201812 A1 Jul. 23, 2015

(30) Foreign Application Priority Data
Jan. 21, 2014 (DE) .................. 10 2014 100 598

(51) Int. Cl.
| | |
|---|---|
| E03C 1/32 | (2006.01) |
| A47K 1/02 | (2006.01) |
| A47B 77/06 | (2006.01) |
| B32B 37/12 | (2006.01) |
| B32B 37/18 | (2006.01) |
| B32B 38/00 | (2006.01) |

(52) U.S. Cl.
CPC .............. *A47K 1/02* (2013.01); *A47B 77/06* (2013.01); *B32B 37/12* (2013.01); *B32B 37/18* (2013.01); *B32B 38/0004* (2013.01); *A47B 2220/03* (2013.01); *B32B 2037/1253* (2013.01); *B32B 2363/00* (2013.01); *B32B 2375/00* (2013.01); *B32B 2479/00* (2013.01); *E03C 1/32* (2013.01); *Y10T 156/10* (2015.01); *Y10T 156/108* (2015.01)

(58) Field of Classification Search
CPC ..................................... E03C 1/32; D06F 1/02
USPC ............................................. 4/643, 631, 650
See application file for complete search history.

(56) References Cited

U.S. PATENT DOCUMENTS

| | | | | | |
|---|---|---|---|---|---|
| 3,028,209 | A | * | 4/1962 | Hinkel | A47B 77/04 312/228 |
| 3,062,608 | A | * | 11/1962 | Magaline | A47B 77/06 312/205 |
| 3,813,706 | A | * | 6/1974 | Williams | A47K 1/04 264/309 |
| 5,735,001 | A | * | 4/1998 | Bitsche | E03C 1/181 4/631 |
| 2009/0255052 | A1 | * | 10/2009 | Booth | D06F 1/00 4/643 |

FOREIGN PATENT DOCUMENTS

| | | |
|---|---|---|
| DE | 9011981 U1 | 10/1990 |
| DE | 202010004016 U1 | 6/2010 |

* cited by examiner

*Primary Examiner* — Huyen Le
(74) *Attorney, Agent, or Firm* — Lucas & Mercanti, LLP

(57) ABSTRACT

A sanitary facility including a washstand of ceramic or porcelain and a piece of support furniture, which carries the washstand and has two side walls and a front wall, on the upper end surfaces of which the edges of the washstand rests. The front and side end surfaces of the washstand are processed in such a way that they are flush with the outside surfaces of the side walls and of the front wall. Veneer, covering the outside surfaces, is applied to the end surfaces of the washstand by an adhesive bond and extends up to the right-angled upper corner of the washstand.

15 Claims, 4 Drawing Sheets

SANITARY FACILITY COMPRISING A WASHSTAND AND A SUPPORT CABINET

The present application claims priority of DE 10 2014 100 598.8, filed Jan. 21, 2014, the priority of this application is hereby claimed and this application is incorporated herein by reference,

BACKGROUND OF THE INVENTION

The invention pertains to a sanitary facility comprising a washstand of ceramic or porcelain and a piece of support furniture, which carries the washstand and comprises two side walls and a front wall, on the upper end surfaces of which the edges of the washstand rest.

Washstands are enjoying increased popularity, because, as a one-piece component, they comprise not only the wash basin itself but also two relatively large shelf areas at the sides, which, because the washstand as a whole is made of ceramic or porcelain, are highly attractive but also easy to clean, while at the same time offering enough space to hold various items. Such washstands are frequently mounted on a piece of support furniture, which is usually configured as a cabinet and which also offers storage space. The support furniture comprises not only a bottom but also a front wall and two side walls, wherein the front wall can obviously be provided, if desired, with one or two swinging doors or the like. The dimensions of the support furniture are selected so that they are essentially the same as the dimensions of the washstand. That is, the side and front walls are essentially flush with the edges of the washstand, so that the edges of the washstand rest on the end surfaces of the front and side walls. In this area, there is necessarily a relatively irregular transition from the wall to the washstand, because the dimensions of the washstand—since it is a fired body—do not always remain the same from one washstand to another as a result of the shrinkage which occurs during the firing process. In addition, the supporting cabinet is not a mass-produced product with dimensions accurate to the millimeter, which means that occasionally there are slight setbacks or gaps in the transition area. On occasion these are not all that attractive, and there is also the danger that water standing on the side areas of the washstand and possibly dripping over the side can penetrate into this area.

SUMMARY OF THE INVENTION

The invention is therefore based on the problem of providing a sanitary facility consisting of a washstand and its support furniture which is improved with respect to the situation just described.

To solve this problem, it is provided according to the invention in the case of a sanitary facility of the type described above that the front and side end surfaces of the washstand are processed in such a way that they line up flush with the outside surfaces of the end walls and the front wall, and that the veneer which is applied to the outside is applied by means of an adhesive to the end surfaces of the washstand and extends to the right-angled upper corner of the washstand.

In the sanitary facility according to the invention, the veneer which covers the entire outside surface of the associated side and front walls overlaps the end surfaces of the washstand in the edge area, so that a complete, flat wall surface is obtained on all sides. To makes this possible, the end surfaces of the washstand in the area of the edges is processed and ground flat to a defined degree, so that flat end surfaces with 90° corners at the top are obtained. Because the corner dimensions of the washstand are therefore known, it is therefore possible to build an appropriately dimensioned piece of support furniture, such that the outside surfaces of the side walls and of the front wall, which are made in the form of an appropriate wood framework, are flush with these flat end surfaces of the washstand. Alternatively, it is possible, in cases where the dimensions of the support furniture are known, to process the washstand correspondingly to the exact dimensions required. Veneer is applied to the outside surfaces of the side walls and of the front wall; this veneer, which forms the visible surface of the support furniture, can be genuine wood veneer, a decorative veneer, or a laminated veneer. The veneer covers the entire wall surface, and, because a completely level transition from the wall surface to the associated end surface of the washstand is present, the veneer also forms a flat cover surface extending over the associated adjacent end surface of the washstand, to which it is permanently bonded by means of an appropriate adhesive. The veneer extends exactly to the right-angled upper corner of the washstand and is therefore flush with it. The adhesive bond ensures a tight joint, which excludes the penetration of water into this area.

Thus what is obtained is a sanitary facility provided with a veneer which covers both the support furniture and the edges of the washstand. The side walls and the front wall have level surfaces also; there are no setbacks or gaps, etc., wherein a completely tight transition from the support furniture to the washstand is ensured by way of the adhered veneer and the adhesive joint.

It is advisable for the edge surfaces of the washstand and the end surfaces of the front and side walls, i.e., the surfaces which face, and rest on, each other, to fit together in positive fashion. According to this embodiment of the invention, therefore, the components rest flat, two-dimensionally, on each other. This can be easily achieved in that, first, the end surfaces of the front and side walls, which usually consist of a wood material or fiber material, are machined appropriately flat, and, second, in that the bottom surface of the washstand is also ground appropriately in the corner area, if it is not already flat enough.

There are various conceivable ways of realizing this positive fit. According to a first alternative according to the invention, the flat outer part of the underside of the washstand can lie flat on the associated end surface. That is, in the installed state, the underside of the washstand is positioned horizontally; that is, the edge areas lie in a flat, horizontal plane, which is also true for the end surfaces of the front and side walls.

Alternatively, a groove can be formed in the underside of the washstand in the area of the edge; the associated wall then fits into this groove. This groove, which faces downward and is open at the ends, is preferably also rectangular, and its width is calculated so that the end surface of the remaining upper web of the groove is, again, flat and flush with the outside surface of the associated wall of the cabinet. The associated cabinet wall, which, in cross section, obviously comprises rectangular corners, is inserted into the groove and is thus positively held in position there.

According to third alternative of the invention, the edge surfaces of the washstand and the end surfaces of the associated walls of the support cabinet are fitted together in positive fashion by means of a miter joint. The surfaces resting against each other therefore extend at a defined, identical angle, so that again a positive fit is achieved.

In the case that a groove is provided in the washstand or that the edge of the washstand is mitered, the removal of material necessarily means that the end surface of the washstand becomes somewhat narrower. The dimensions of the groove should be calculated so that the web of the groove leading to the end surface comprises a height of ≤10 mm, especially ≤5 mm, and preferably of approximately 2 mm. If a miter is provided, this should be of such a kind and extend in such a way that the end surface adjoining the miter on the washstand comprises a similarly dimensioned height; that is, here too, the height should be ≤10 mm, especially ≤5 mm, and preferably approximately 2 mm. Even in the case of an end surface with a height of only 2 mm, a sufficient bonding surface is still available for the veneer.

The preferred adhesive is an epoxy resin or polyurethane (PU) adhesive, which makes it possible to bond the veneer permanently to the ceramic or porcelain washstand. In addition, an epoxy resin or PU adhesive can also provide sufficient impermeability.

As previously described, the veneer can be a genuine wood veneer, a decorative veneer, or a laminated veneer. There are ultimately no limitations on the nature of the material to be chosen. This also means that it is possible to choose from a wide spectrum of colors and patterns for the veneer forming the visible surface.

In addition to the sanitary facility, the invention also pertains to a method for producing a sanitary facility of the previously described type. This method is characterized in that, on the side walls and front walls, a section of veneer projecting beyond the associated end surface is provided; after which the end surface of the washstand—as a function of the distance of the veneer sections from each other and from the rear of the cabinet—is machined; after which a layer of adhesive is applied to the inside surface of the veneer sections and/or to the end surfaces of the washstand; after which the washstand is set down onto the support furniture, so that the veneer sections are positioned opposite the end surfaces of the washstand and are bonded to them by the adhesive layer.

According to the method, therefore, the support furniture is built first and machined in such a way that the edges of the corresponding veneer sections, which will later overlap the end surfaces of the installed washstand, are freely exposed. Then the distance between the veneer sections of the side walls to each other and the distance between the veneer section of the front wall to the rear of the cabinet are measured precisely. These distance values serve as target parameters for the machining of the washstand, i.e., its side surfaces. These are now machined in such a way that the distance between the side surfaces and the distance to the rear side of the washstand correspond precisely to the corresponding distances between the veneer sections. The washstand machined in this way can then—after the appropriate application of an adhesive—be inserted into what amounts to the "frame" formed by the veneer sections. Because the distance values have been adapted to each other, the washstand is therefore seated without any gaps inside the veneer sections, which are bonded permanently to the washstand by the layer of adhesive.

To form the veneer sections, the associated wall of the support furniture can be processed at the associated end surface in a material-removing manner, especially by milling, so that the veneer section is exposed. Normally, the wall component in question is a prefabricated component consisting of a framework of wood or fiberboard, which has already been covered with veneer. To "expose" the veneer sections, the framework material is now removed in the area of the end surface; this process simultaneously serves to form an end surface of a defined shape, which varies depending on how the end surfaces and the underside of the washstand are to rest positively against each other.

It is advisable to calculate the height of the veneer sections in such a way that they project somewhat beyond the upper edge of the washstand. According to the invention, after the washstand has been seated the veneer sections have been bonded in place, the corresponding projections of the veneer sections beyond the upper corner of the washstand are cut off, so that the edges are now flush at the surface.

Depending on how the positively fitting transition from washstand to cabinet wall is configured, either a groove can be formed on the underside of the washstand near the edge, into which the associated wall fits, or the underside of the washstand can also be milled flat, so that the washstand and the associated end surfaces of the walls rest flat against each other.

According to a third alternative, a mitered surface, by which the two components rest against each other, can be formed on the washstand and on the associated cabinet wall.

As the preferred adhesive, finally, an epoxy resin or polyurethane adhesive is used.

BRIEF DESCRIPTION OF THE DRAWING

Additional advantages, features, and details of the invention can be derived from the exemplary embodiment described below and from the drawings.

DETAILED DESCRIPTION OF THE INVENTION

Figure 1:
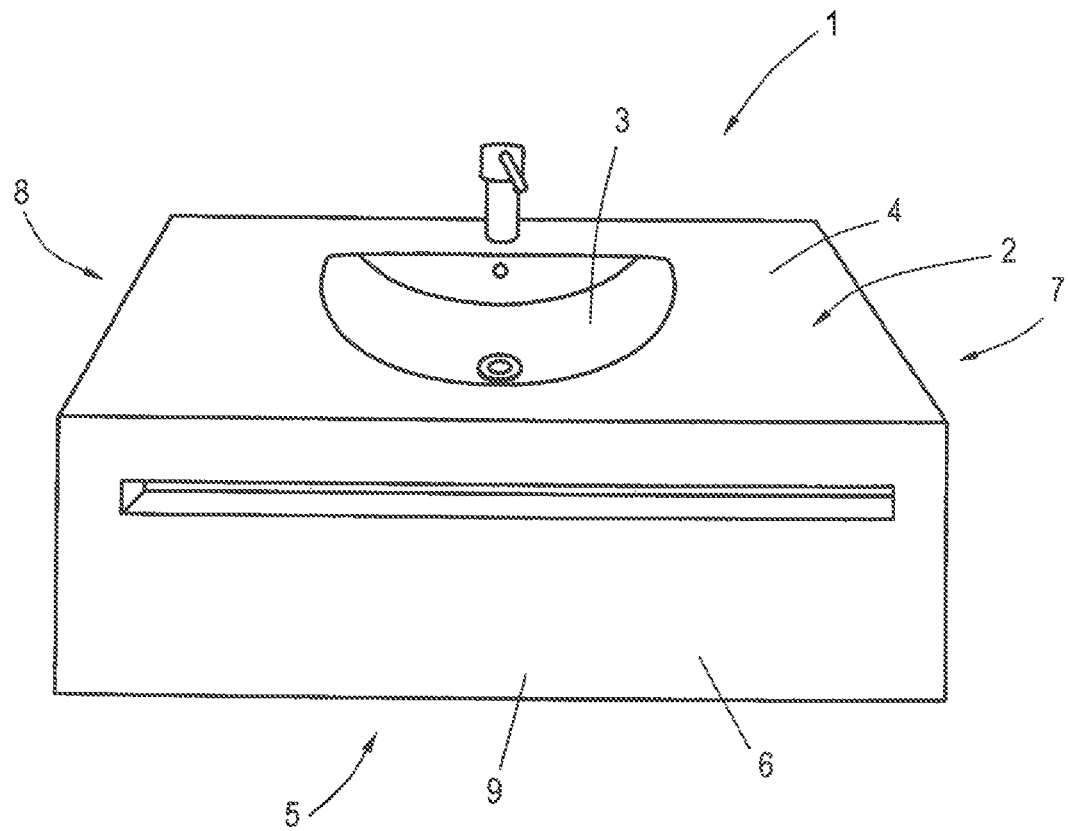
FIG. 1 shows a perspective view of a sanitary facility according to the invention.

FIG. 1 shows a sanitary facility 1 according to the invention comprising a washstand 2 of ceramic or porcelain, which comprises, in the known manner, at least one sink area 3 and shelf areas 4 surrounding it at the front, rear, and sides, these areas being horizontal when in the installed position.

The sanitary facility 1 also comprises a piece of support furniture 5, comprising at least a front wall 6 and two side walls 7, 8 and also usually a bottom (not shown). The support furniture is built as a prefabricated element, in which the washstand 2 is seated. The underside of the edges of the washstand 2 rest on corresponding end surfaces of the individual walls 6, 7, 8, as will be discussed in greater detail below.

Each of the walls 6, 7, 8 is covered with veneer 9, wherein, in FIG. 1, only the veneer 9 for the front wall is shown. This veneer 9 covers the entire surface of the associated wall and extends beyond the wall, so that the corresponding end surfaces of the sides of the washstand 2 are overlapped. The veneer 9 extends to the upper edge of the washstand 2, is flush with it, and is bonded to its end surfaces. This will be discussed in more detail below.

Figure 2:
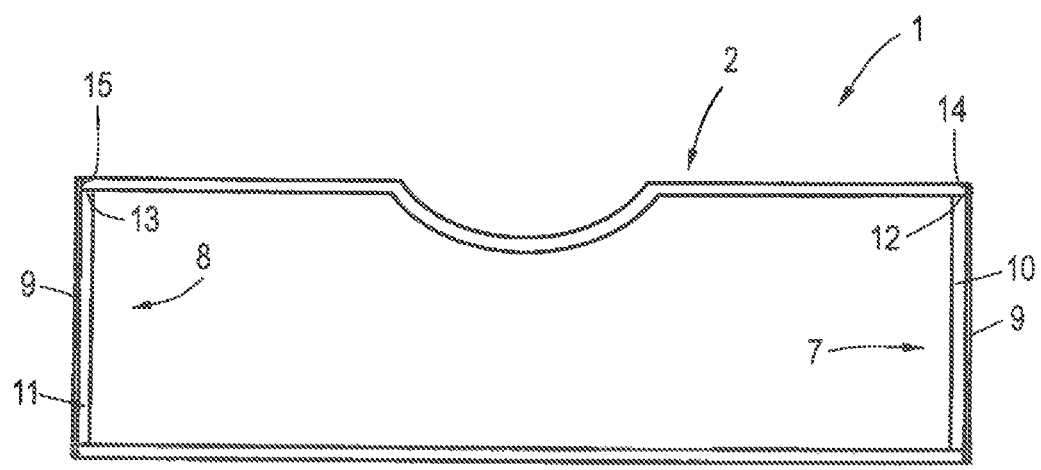
FIG. 2 shows a cross-sectional view of a detail of a sanitary facility.

FIG. 2 shows a cross-sectional view through the sanitary facility 1 of FIG. 1. Shown here are the two side walls 7, 8, each of which consists of the wall board 10, 11 itself, such as a wood or plywood board or a piece of fiberboard. The outside surface of each side wall 7, 8—the same being true for the front wall 6—is covered with the veneer 9, which can be genuine wood veneer, a decorative veneer, or the like.

The washstand 2 rests by its edges on the upper end surfaces 12, 13 of the side walls 7, 8 and obviously also on the upper end surface of the corresponding front wall 6, all of which, in the example shown here, are flat and horizontal. As can be seen, the various pieces of veneer 9 on the two side walls 7, 8 and on the front wall 6 extend over the end surfaces 14, 15 of the washstand 2 and also over its front end surface.

To make this possible, the end surfaces 14, 15 of the washstand 2 and the corresponding front end surface are ground flat by means of a suitable grinding machine or milling machine, so that precisely flat surfaces are obtained.

Figure 3:
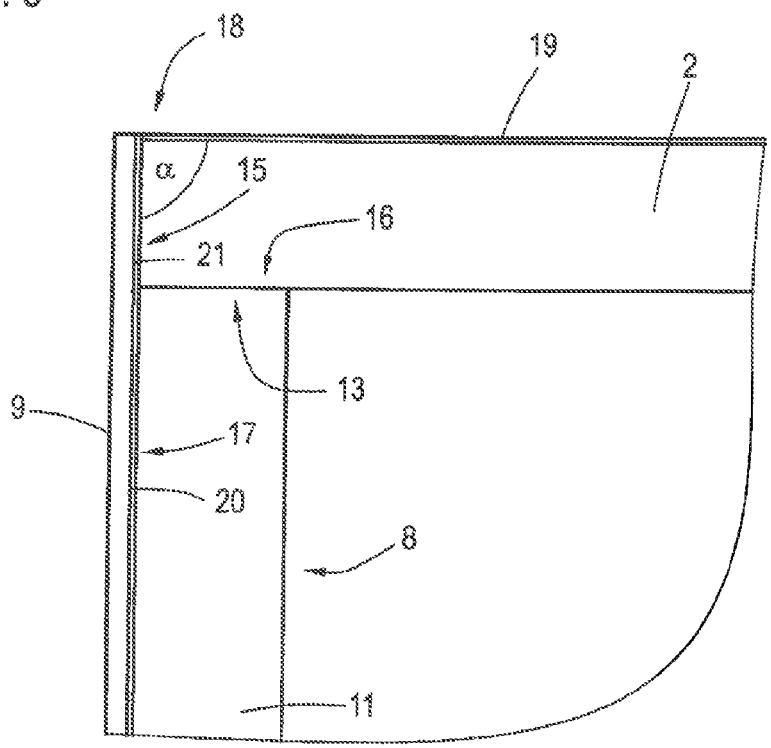
FIG. 3 shows an enlarged partial view of the veneer-covered transition area between a wall and the washstand.

FIG. 3 shows a first example of a joint area, here, by way of example, the joint between the side wall 8 and the washstand 2.

What is shown is the side wall 8 with its wall board 11 and its end surface 13, which is also preferably made flat by appropriate milling. The underside 16 of the washstand 2 is also ground flat, if necessary, in the area of the edges, so that the underside 16 and the entire end surface 13 rest positively against each other.

The side surface 15 is also ground flat as described. It is flush with the outside surface 17 of the wall board 11 or of the associated side or front wall, so that a completely flat surface consisting of the outside surface 17 and the end surface 15 is obtained. This applies to all of the transitions between a wall and the washstand.

As a result of the appropriate grinding of the end surface 15 of the washstand 2, there results a right-angled corner 18 on the washstand, as illustrated by the angle α. That is, therefore, the transition to the layer of glaze 19 provided on the top surface of the washstand 2, which is only a few tenths of a millimeter thick, is also perfectly level.

As can be seen, the decorative layer 9 is applied to the side wall 8 by means of an appropriate adhesive joint 20 the same obviously being also true for the other walls. The veneer 9 now extends beyond the wall itself and covers the end surface 15, to which it is bonded by means of another adhesive layer 21. This adhesive layer 21 extends exactly as far as the corner 18; veneer 9 and adhesive layer 21 are flush at the corner 18 with the top surface of the washstand 2.

The same is true for all of the side and front end surfaces of the washstand 2; the washstand is therefore enclosed on these sides by the veneer. By means of the adhesive layer 21, an impermeable, completely gapless joint is obtained. The veneer 9 for it own part covers the associated wall and the associated end surface, forming a completely uniform, flat surface, so that there are no breaks or the like of any kind to be seen.

Figure 4:
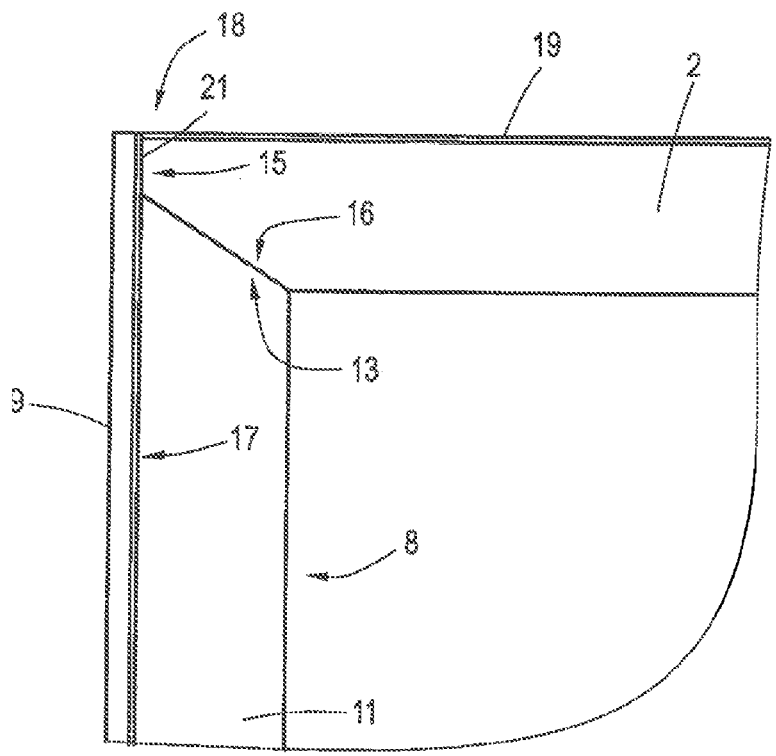
FIG. 4 shows a view similar to that of FIG. 3 with mitered contact surfaces between the wall and the washstand.

FIG. 4 shows another embodiment of this joint area. Whereas, in the embodiment according to FIG. 3, the two surfaces 13 and 16 are both horizontal, so that a 90° joint is obtained, in the case of the embodiment according to FIG. 4 the end surface 13 and the underside 16 are both mitered. This leads in turn to a positive fit between them. Nevertheless, the end surface 15—and this applies, as previously mentioned, to all of the other end surfaces, i.e., those on the opposite side wall and the front wall—is now much narrower. The remaining height should be ≤1 cm, and preferably ≤5 mm or slightly less. It should in all cases be selected so that there is still sufficient ceramic or porcelain material remaining to support the glaze 19.

Independently of that, the veneer 9 again extends beyond the outside wall 8 and overlaps the end surface 15, to which it is again bonded by means of the adhesive layer 21. In the area of the corner 18, what is obtained here again is a flush and flat joint, which is completely impermeable, thanks to the adhesive layer 21.

Figure 5:
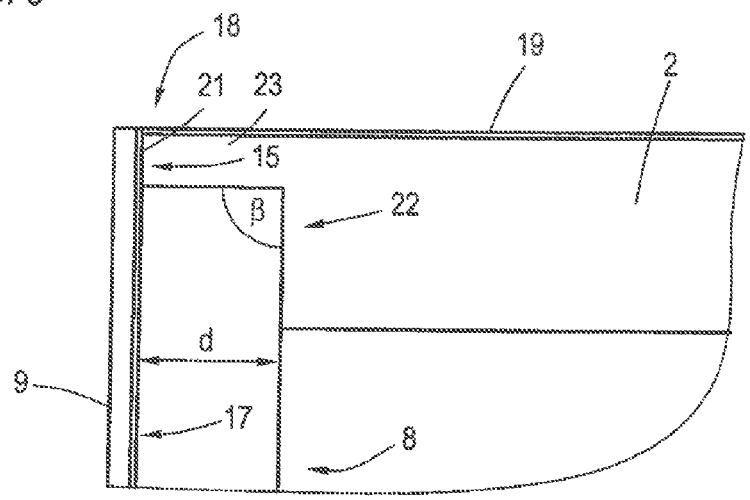
FIG. 5 shows another view similar to that of FIG. 3 with a groove formed on the washstand, into which the wall fits.
Figure 6:
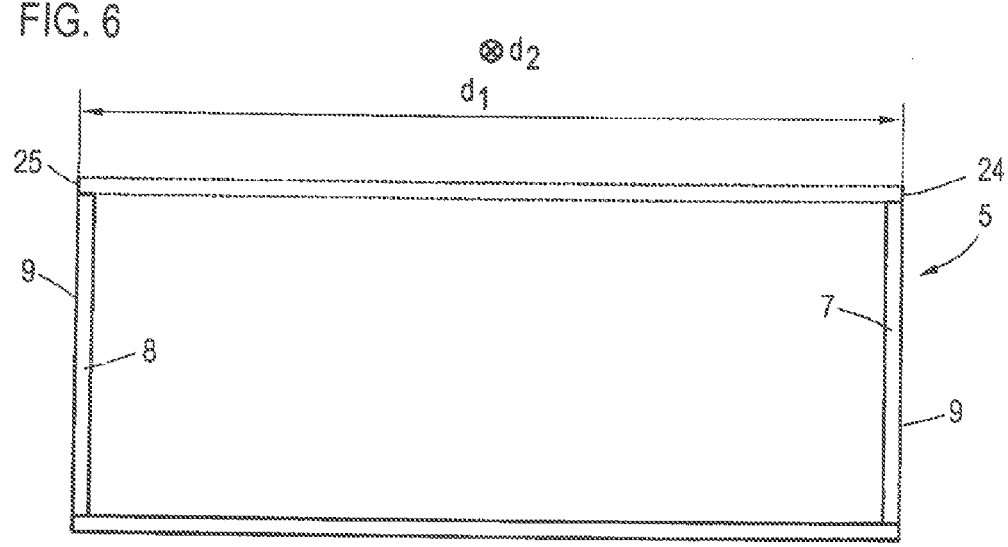
FIGS. 6-10 show various views intended to explain the method for producing a sanitary object according to the invention.

FIG. 5 shows an embodiment of the same joint area in which a groove 22 is formed at the edge of the washstand 2; the groove is rectangular; that is, it corresponds to the shape of the corner area of the side wall 8, as indicated by the angle β. The depth of the groove corresponds to the thickness d of the associated wall, so that the wall will fit completely into the groove 22. That is, the remaining web 23, which forms the top boundary of the groove and which comprises the end surface 15—or, obviously, the end surfaces of the other walls—is machined in such a way that ultimately its length exactly matches the dimension d of the wall. The end surface 15 is ground completely flat here, too, so that again a flat transition is obtained from the outside surface 17 to the end surface 15. The thickness of the web 23 of the groove is calculated so that it is again ≤1 cm, and preferably ≤5 mm. In all cases it is to be dimensioned in such a way that there will be sufficient ceramic or porcelain material left to support the glaze 19.

As can be seen, the veneer 9 extends here, too, over the outside surface 17 of the wall and over the end surface 15, where the veneer is bonded in place by the adhesive layer 21.

In the area of the rectangular corner 18, what is obtained is again a flat, impermeable, flush joint.

FIGS. 6-10 illustrate by way of example the various steps of a method according to the invention for producing a sanitary facility according to the invention. As shown in the schematic diagram according to FIG. 6, the support furniture 5 is built first, the support furniture 5 being shown here without the front wall. Only the side walls 7 and 8, on which the corresponding veneers 9 have already been applied, are shown. The upper ends of the various walls have already been machined so that appropriately exposed veneer sections 24, 25 are obtained, a corresponding veneer section also being obtained, of course, in the area of the front wall 6. For this purpose, the wall in question is processed by a material-removing method using an appropriate milling tool or the like, insofar as the corresponding veneer 9 does not already extend beyond the wall in question from the very beginning.

Once the support cabinet 5 has been constructed, the distance between the two veneer sections 24, 25, here the distance $d_1$, and the distance between the veneer section on the front wall 6 (not shown) and the rear wall of the support cabinet 5, as indicated by the cross symbol and the distance $d_2$, are measured exactly.

Figure 7:
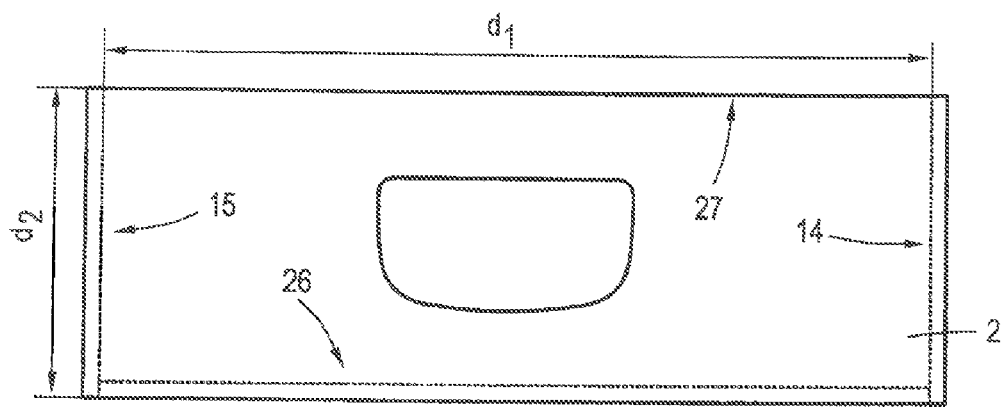
Figure 8:
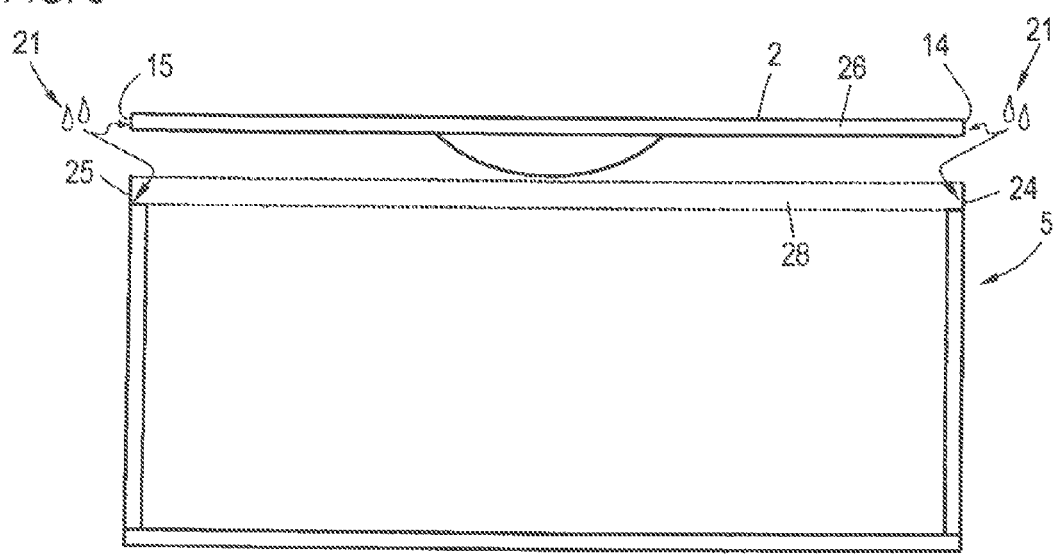

In the next step, as illustrated in FIG. 7, the washstand 2, shown here from above, is machined by an appropriate machining tool, preferably a grinding machine, so that, in the area of the side corners, the corresponding flat end surfaces 14, 15 and, in the area of the front end surface, the flat end surface 26, are obtained. The corresponding end surfaces 14, 15, 26 are illustrated by the broken lines. The distance between the end surfaces 14, 15 thus produced corresponds exactly to the dimension $d_1$, therefore to the distance between the veneer sections 24, 25. The distance of the end surface 26 to the rear end surface 27 corresponds to the distance value $d_2$ from the veneer section of the front wall (not shown) to the rear side of the support cabinet 5.

In the next step (see FIG. 8), the washstand 2 is "seated" in the support cabinet 5; that is, it is inserted into the "frame" created out of the veneer sections 24, 25 and the front veneer section 28, shown here in broken line by way of example. Before that, as indicated by the teardrop symbols, an adhesive layer 21 is applied to the inside surfaces of the veneer sections 24, 25, 28 and/or the corresponding end surfaces 14, 15, 26. When the washstand is put in place, it lies on the corresponding end surfaces of the individual walls. The veneer sections 24, 25, 28 are bonded to the end surfaces 14, 15, 26 of the washstand 2.

Figure 9:
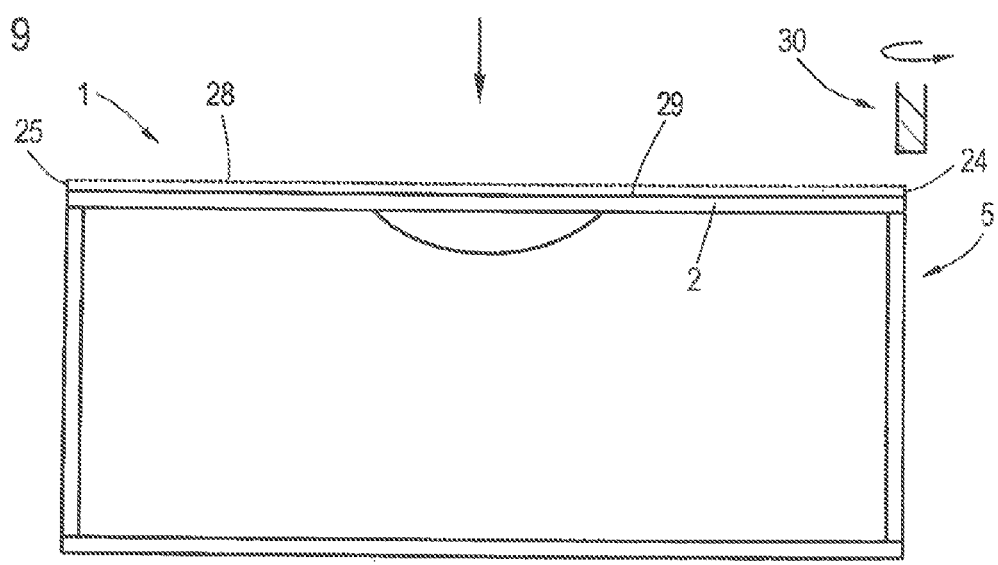
Figure 10:
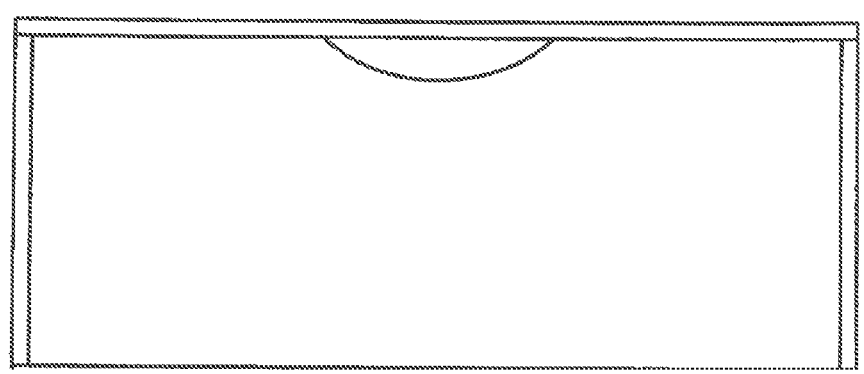

FIG. 9 shows the sanitary facility 1 after the seating of the washstand 2 in the support cabinet 5. As can be seen, the veneer sections 24, 25, 28 project slightly beyond the top surface 29 of the washstand 2. By means of an appropriate tool 30, the projecting veneer material is now cut off, so that, as FIG. 10 shows, a flush corner joint is obtained.

FIGS. 6-10 describe a production method in which, first, the support cabinet is produced, on which the corresponding dimensions $d_1$ and $d_2$ are measured, which then serve as the basis for the machining of the washstand. This is advisable, since it is quite feasible to use an appropriate grinding machine, which can obviously be set up appropriately to grind the washstand, as an independent component, as needed, to the measured dimensions $d_1$ and $d_2$. That is, therefore, the dimensions to which the washstand 2 is ground are based on the dimensions of the support cabinet 5.

In principle, however, the inverse of that procedure would also be conceivable. In this case, the washstand 2 would be machined first, in which case, because the grinding machine can be programmed as needed, each washstand would obviously have exactly the same dimensions. Then the associated support cabinet 5 would be fabricated according to these dimensions.

The invention claimed is:

1. A sanitary facility comprising a washstand of ceramic or porcelain and a piece of support furniture, which carries the washstand and comprises two side walls and a front wall, on the upper end surfaces of which the edges of the washstand rest, wherein the front and side end surfaces of the washstand are machined in such a way that they are flush with the outside surfaces of the side walls and of the front wall, and in that a veneer covering the outside surfaces is applied to the end surfaces of the washstand by means of an adhesive joint and extends to a rectangular upper corner of the washstand.

2. The sanitary facility according to claim 1, wherein the edge surfaces of the washstand and the end surfaces (13) of the front and side walls, namely, the surfaces which face, and rest on, each other, rest against each other with a positive fit.

3. The sanitary facility according to claim 2, wherein the flat edge areas of the underside of the washstand rest flat on the associated end surface.

4. The sanitary facility according to claim 2, wherein a groove, in which the associated wall fits, is formed in the underside of the washstand.

5. The sanitary facility according to claim 4, wherein the web of the groove leading to the end surface or the end surface adjoining the miter of the washstand comprises a height of $\leq 10$ mm, especially of $\leq 5$ mm, and preferably of approximately 2 mm.

6. The sanitary facility according to claim 2, wherein the edge surfaces of the washstand and end surfaces of the associated walls are mitered together.

7. The sanitary facility according to claim 1, wherein the adhesive forming the adhesive joint is an epoxy resin adhesive or a polyurethane adhesive.

8. The sanitary facility according to claim 1, wherein the veneer is a genuine wood veneer, a decorative veneer, or a laminated veneer.

9. A method for producing a sanitary facility according to claim 1, wherein a section of veneer extending beyond the associated end surface is provided on the side walls and the front wall; after which the end surfaces of the washstand are machined as a function of the distances $d_1$, $d_2$ of the veneer sections from each other and from the rear of the cabinet; after which an adhesive layer is applied to the inside surface of the veneer sections and/or to the end surfaces of the washstand; after which the washstand is seated in the support furniture, so that the veneer sections lie opposite the end surfaces of the washstand and are bonded thereto by the adhesive layer.

10. The method according to claim 9, wherein, to form the veneer sections, the associated wall of the support furniture is processed by removal of material, especially by milling, at the associated end surface, so that the veneer section is exposed.

11. The method according to claim 9, wherein, after the washstand has been seated and the veneer sections have been adhered, the projection of the veneer sections beyond the upper corner of the washstand is cut off.

12. The method according to claim 9, wherein a groove is formed in the underside of the washstand near the edge, into which the associated wall is fitted.

13. The method according to claim 9, wherein the underside of the washstand is milled flat.

14. The method according to claim 9, wherein, on the washstand and on the associated wall, mitered surfaces are formed, by which the two surfaces rest against each other.

15. The method according to claim 9, wherein an epoxy resin adhesive or a polyurethane adhesive is used as the adhesive forming the adhesive bond.

* * * * *